Aug. 14, 1923.
W. N. BOOTH
1,464,495
METHOD OF FORMING VEHICLE WHEELS
Filed April 15, 1918    2 Sheets-Sheet 1
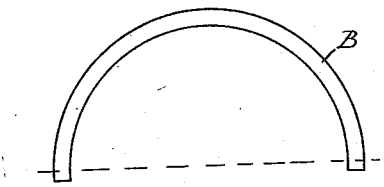
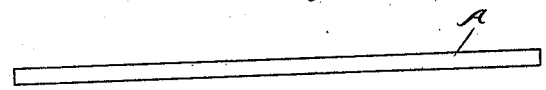
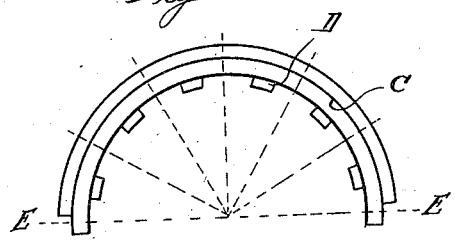
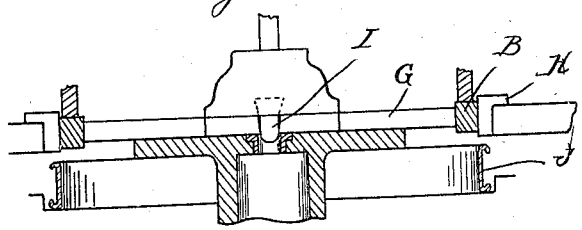
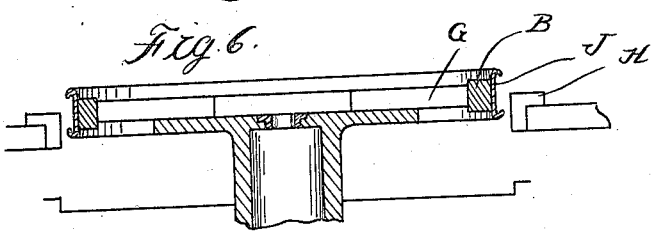
Inventor
William N. Booth
By Whittemore Hulbert & Whittemore
Attorneys

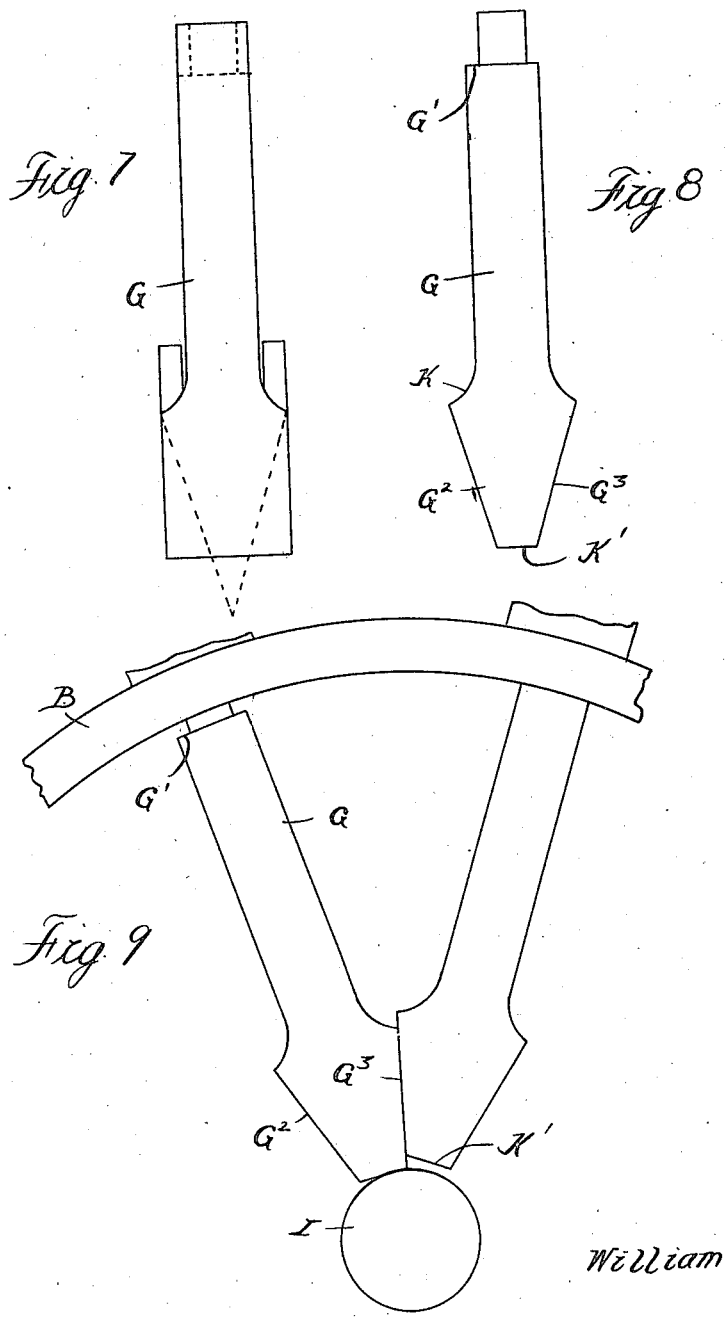

Patented Aug. 14, 1923.

1,464,495

UNITED STATES PATENT OFFICE.

WILLIAM N. BOOTH, OF DETROIT, MICHIGAN.

METHOD OF FORMING VEHICLE WHEELS.

Application filed April 15, 1918. Serial No. 228,688.

*To all whom it may concern:*

Be it known that I, WILLIAM N. BOOTH, a citizen of the United States of America, residing at Detroit, in the county of Wayne and State of Michigan, have invented certain new and useful Improvements in Methods of Forming Vehicle Wheels, of which the following is a specification, reference being had therein to the accompanying drawings.

The invention relates to the manufacture of vehicle wheels of that type provided with wooden spokes and felly, and it is the object of the invention to simplify the process of manufacture and eliminate certain inaccuracies and defects unavoidable in manufacturing processes heretofore employed.

In the usual method of forming wheels, the fellies are bent into substantially semi-circular form, are then bored for engagement with the spoke tenons and cut off to the proper length. In assembling the wheel the felly sections are pressed into engagement with the spokes and are then mounted upon a temporary hub, which is placed in a lathe and the periphery of the felly trued to circular form, being finally pressed into engagement with the metallic rim or tire. This process is open to the objections, first, that additional stock must be provided in the felly for the truing operation; second, as the inner face of the felly is not trued the latter will be of uneven thickness at different points; third, there is a tendency for the felly to spring out of engagement with the spokes when relieved from the press, so that subsequently these spokes will be loose.

In another process of manufacture, the felly sections after engagement with the spokes are directly pressed into the rim without any truing operating. One difficulty with this process is to obtain the proper circumferential length of felly to fit the metallic rim, which is of standard size, and also to obtain accurate radial arrangement of the spokes and equal pressure thereon from all sides of the felly. This difficulty is primarily due to the fact that the bent felly sections are seldom accurate in form and are not arcs of a true circle. There is therefore no means of accurately gauging to determine the line of cut-off, and the result is that the sections vary in peripheral length and may be either longer or shorter than required. Also the angle of the cut cannot be accurately determined, and when the sections are forced into true circular form the abutting ends will not be in full contact. Still another difficulty is to secure accuracy in boring the felly for receiving the spoke tenons. If the felly is not true the bores will not all be radial, which will result in misalignment of the spokes.

With my improved method I overcome all of the difficulties above described: first, by conforming the inaccurately-bent felly to the predetermined, exact circular form; second, by performing upon the felly while held in true form the operation of cutting off to the exact length and boring for the spokes; third, by circumferentially compressing the assembled felly sections and spokes and laterally forcing the same while thus compressed into engagement with the felly band; and fourth, by applying to the spokes during the compression of the felly a counteracting force which insures full engagement of the tenons with the recesses for receiving the same.

In the drawings I have illustrated the successive steps of my improved process, in which Figure 1 is an elevation of the straight stock from which the bent felly section is formed; Figure 2 is an elevation of the bent section; Figure 3 illustrates the manner of conforming the inaccurately bent section to the true circular form, also indicating in dotted lines the exact plane of cut-off and angles for the several bores; Figure 4 is a plan view showing the operation of circumferentially compressing the assembled spokes and felly sections; Figure 5 is a cross-section illustrating the manner of applying the counteracting force to the inner ends of the spokes to force the same into full engagement with their sockets; Figure 6 is a similar view showing the felly forced into engagement with the rim; Figures 7 and 8 show the method of forming the spokes; and Figure 9 is a plan view showing the manner of aligning the shoulders of the spokes.

A represents the straight stock from which the felly sections are formed, this being cut to suitable dimensions. The stock is then bent by the usual process into substantially semi-circular form, as indicated at B Figure 2. The bent sections are then conformed to a true arc, and while thus conformed are cut to accurate length and bored for engagement with the spokes. The accurate conformation of the sections is preferably accomplished by first planing the outer and inner surfaces thereof and then forcing one of said surfaces, preferably the external surface, into contact with a segmental guide C of predetermined radius and by suitable means such as the internal pressor members D. This guide will hold the true form during the boring operation by which the tenon-receiving recesses are formed and the sections are also trimmed to accurate length, as indicated by the dotted line E—E, so as to form complementary portions of the full circle.

The felly sections bored and trimmed as described are next assembled with tenoned spokes G, as shown in Figure 4, after which the complementary sections are placed together and are subjected to a circumferentially applied radial pressure. Preferably this pressure is applied through a series of segmental jaws which are simultaneously moved radially inward while at the same time an opposing pressure is applied to the inner ends of the spokes by suitable means such as the center pin I. As shown in Figure 5, the pin I is slightly tapered and when forced in laterally exerts the outward pressure on the spokes. After the circumferential compression the felly sections are engaged with a peripheral band, preferably by forcing them while still under the pressure of the jaws H laterally into engagement with the rim J. This rim being of true circular form will hold the felly and spokes true and the whole may then be completed by boring concentric to the rim and engaging the hub therewith.

The spokes G which are engaged with the felly sections are accurately formed so as to be of uniform length between their inner ends and the shoulders G' which bear against the inner face of the felly. In forming these spokes the shoulders K between the bevelled inner ends and the round spindle portion are employed for locating the spoke while operated upon by the cutters forming the tenons and shoulders G' and also the bevelled faces G² and G³. Furthermore, the inner ends K' of the bevelled portions are trimmed or otherwise formed to be in exact dimension from the shoulders K.

In assembling the wheel, the inner ends K' of the spokes will abut against the center guide pin I and will thus be held an exact distance from the center. This will cause the shoulders K to lie flush with each other and will also force the shoulders G' against the felly with equal pressure. Thus in use the load will be uniformly distributed on the spokes, and the fact that the shoulders K lie flush with each other eliminates the necessity of hand-work in finishing, which has always been necessary in constructions heretofore used.

With a wheel formed as described there is not only accuracy when first made but the same accuracy will be maintained. This is for the reason that neither the spokes nor the felly sections have been overstressed or placed under unequal pressure, and the felly being of uniform thickness will be equally strong in all portions.

What I claim as my invention is:

1. The method of forming spoked wheels, comprising the assembling of a plurality of complementary spoked felly sections of exactly predetermined length of arc, compressing said sections circumferentially against an opposing pressure at the inner ends of the spokes, conforming the outer surface of the felly to a true circle of exactly predetermined diameter, and engaging the sections with a circular retaining rim or band of corresponding diameter.

2. The method of forming spoked wheels, comprising the forming of spokes of exactly predetermined radial length, engaging said spokes with felly sections of exactly predetermined length of arc, assembling complementary spoked felly sections and applying circumferential pressure thereto against opposed pressure at the inner ends of the spokes, and engaging the compressed sections with a felly rim of corresponding size.

3. The method of forming spoked wheels, comprising the forming of spokes of exactly predetermined radial length, engaging the spokes with felly sections of exactly predetermined length of arc, assembling complementary felly sections, radially compressing the felly and spokes against a central guide, and engaging the same while thus compressed with the felly rim.

4. The method of forming wheels, comprising the forming of spokes with tenoned outer ends and bevelled inner ends, the length between the shoulder of the tenon and the point of intersection of the planes of the bevelled surfaces being exactly predetermined, engaging the tenons of the spokes with bores in the felly sections, assembling the spoke and felly sections around a central abutment, radially compressing and engaging the felly rim while still compressed.

5. The method of assembling spoked wheels, comprising engaging the spokes with complementary felly sections, radially compressing said felly sections in alignment with said spokes and applying an equal resisting pressure to the inner end of each of the spokes during said compression.

6. The method of forming wheels, comprising the forming of complementary felly sections of a true arc of predetermined radius, assembling with said sections spokes having bevelled inner ends and tenoned outer ends, being of exactly predetermined radial length between the point of intersection of the planes of the bevelled surfaces and the shoulders of the tenons, and radially compressing the felly sections in alignment with said spokes and against a central resistance.

7. The method of forming wheels, comprising the forming of spokes with bevelled inner end portions and shoulders between the same and the radially-extending spindle portions, said shoulders being exactly located with respect to the inner ends of the spokes, engaging the spokes with felly sections, assembling the spoked felly sections around a central abutment, and circumferentially compressing said felly sections against said spokes and central abutment.

In testimony whereof I affix my signature.

WILLIAM N. BOOTH.